United States Patent
Mukherjee et al.

(10) Patent No.: US 11,076,357 B2
(45) Date of Patent: Jul. 27, 2021

(54) UPLINK POWER CONTROL ON UNLICENSED CARRIERS

(71) Applicant: TELEFONAKTIEBOLAGET L M ERICSSON (PUBL), Stockholm (SE)

(72) Inventors: Amitav Mukherjee, Fremont, CA (US); Havish Koorapaty, Saratoga, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 348 days.

(21) Appl. No.: 16/092,209

(22) PCT Filed: Apr. 7, 2017

(86) PCT No.: PCT/IB2017/052028
§ 371 (c)(1),
(2) Date: Oct. 8, 2018

(87) PCT Pub. No.: WO2017/175196
PCT Pub. Date: Oct. 12, 2017

(65) Prior Publication Data
US 2020/0336987 A1  Oct. 22, 2020

Related U.S. Application Data

(60) Provisional application No. 62/320,254, filed on Apr. 8, 2016.

(51) Int. Cl.
*H04W 52/14* (2009.01)
*H04W 52/22* (2009.01)
(Continued)

(52) U.S. Cl.
CPC ......... *H04W 52/146* (2013.01); *H04W 16/14* (2013.01); *H04W 52/221* (2013.01);
(Continued)

(58) Field of Classification Search
None
See application file for complete search history.

(56) References Cited

U.S. PATENT DOCUMENTS

2011/0274064 A1* 11/2011 Luo ............... H04W 52/146
370/329
2013/0343288 A1  12/2013 Ratasuk
(Continued)

FOREIGN PATENT DOCUMENTS

WO  2015/141584 A1  9/2015

OTHER PUBLICATIONS

Huawei et al., "Review of existing unlicensed spectrum regulatory requirements affecting physical layer design", R1-143724, Paragraph 2.2, Oct. 5, 2014.

*Primary Examiner* — Eunsook Choi

(57) ABSTRACT

Systems and methods relating to transmit power control are disclosed. In some embodiments, a method of operation of a radio access node for providing transmit power control commands to a wireless device for uplink (UL) transmission on a cell that operates in an unlicensed frequency spectrum is provided. The method comprises indicating, for the cell that operates in the unlicensed frequency spectrum, a dynamic Transmit Power Control (TPC) command using a downlink (DL) control channel which indicates a DL-UL allocation of upcoming subframes in the cell that operates in the unlicensed frequency spectrum. In some embodiments, the DL control channel is a common DL control channel. In some other embodiments, the DL channel is a common Physical Downlink Control Channel (PDCCH).

19 Claims, 16 Drawing Sheets

(51) Int. Cl.
*H04W 16/14* (2009.01)
*H04W 52/32* (2009.01)
*H04W 52/36* (2009.01)
*H04W 52/42* (2009.01)
*H04W 72/14* (2009.01)
*H04W 74/08* (2009.01)

(52) U.S. Cl.
CPC ....... *H04W 52/325* (2013.01); *H04W 52/367* (2013.01); *H04W 52/42* (2013.01); *H04W 72/14* (2013.01); *H04W 74/0808* (2013.01)

(56) References Cited

U.S. PATENT DOCUMENTS

| | | | |
|---|---|---|---|
| 2016/0050667 A1* | 2/2016 | Papasakellariou | H04L 1/1822 370/329 |
| 2017/0111874 A1* | 4/2017 | Harada | H04W 52/143 |
| 2017/0118728 A1* | 4/2017 | Harada | H04W 16/14 |
| 2017/0265225 A1* | 9/2017 | Takeda | H04W 72/1284 |
| 2017/0273056 A1* | 9/2017 | Papasakellariou | H04W 52/143 |
| 2018/0048498 A1* | 2/2018 | Stern-Berkowitz | H04W 16/14 |

* cited by examiner

UPLINK POWER CONTROL ON UNLICENSED CARRIERS

RELATED APPLICATIONS

This application is a national stage application of International Patent Application No. PCT/IB2017/052028, filed Apr. 7, 2017, which claims the benefit of provisional patent application Ser. No. 62/320,254, filed Apr. 8, 2016, the disclosures of which are hereby incorporated herein by reference in their entireties.

TECHNICAL FIELD

The disclosed subject matter relates generally to telecommunications and more particularly to uplink (UL) power control on unlicensed carriers.

BACKGROUND

The 3rd Generation Partnership Project (3GPP) Release (Rel) 13 feature "License Assisted Access" (LAA) allows Long Term Evolution (LTE) equipment to also operate in the unlicensed 5 Gigahertz (GHz) radio spectrum. The unlicensed 5 GHz spectrum is used as a complement to the licensed spectrum. An on-going 3GPP Rel-14 work item will add uplink (UL) transmissions to LAA. Accordingly, devices can connect in the licensed spectrum (Primary Cell (PCell)) and use Carrier Aggregation (CA) to benefit from additional transmission capacity in the unlicensed spectrum (Secondary Cell (SCell)). Standalone operation of LTE in unlicensed spectrum is also possible and is under development by the MuLTEfire Alliance.

Regulatory requirements may not permit transmissions in the unlicensed spectrum without prior channel sensing. Because unlicensed spectrum must be shared with other radios of similar or dissimilar wireless technologies, a so called Listen-Before-Talk (LBT) method needs to be applied. LBT involves sensing the medium for a predefined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi."

LTE uses Orthogonal Frequency Division Multiplexing (OFDM) in the downlink and Discrete Fourier Transform (DFT)-spread OFDM (also referred to as Single Carrier Frequency Division Multiple Access (FDMA) (SC-FDMA)) in the UL. The basic LTE downlink physical resource can thus be seen as a time-frequency grid as illustrated in FIG. 1, where each resource element corresponds to one OFDM subcarrier during one OFDM symbol interval. The UL subframe has the same subcarrier spacing as the downlink (DL) and the same number of SC-FDMA symbols in the time domain as OFDM symbols in the DL.

In the time domain, LTE downlink transmissions are organized into radio frames of 10 milliseconds (ms), each radio frame consisting of ten equally-sized subframes of length $T_{subframe}=1$ ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 microseconds (μs).

Furthermore, the resource allocation in LTE is typically described in terms of Resource Blocks (RBs), where a RB corresponds to one slot (0.5 ms) in the time domain and 12 contiguous subcarriers in the frequency domain. A pair of two adjacent RBs in time direction (1.0 ms) is known as a RB pair. RBs are numbered in the frequency domain, starting with 0 from one end of the system bandwidth.

DL transmissions are dynamically scheduled, i.e., in each subframe the base station transmits control information about which terminals data is transmitted to and upon which RBs the data is transmitted, in the current DL subframe. This control signaling is typically transmitted in the first 1, 2, 3, or 4 OFDM symbols in each subframe and the number n=1, 2, 3, or 4 is known as the Control Format Indicator (CFI). The DL subframe also contains common reference symbols, which are known to the receiver and used for coherent demodulation of, e.g., the control information. A DL system with CFI=3 OFDM symbols as control is illustrated in FIG. 3. The reference symbols shown there are the Cell Specific Reference Symbols (CRSs) and are used to support multiple functions including fine time and frequency synchronization and channel estimation for certain transmission modes.

UL transmissions are dynamically scheduled, i.e., in each DL subframe the base station transmits control information about which terminals should transmit data to the enhanced or evolved Node B (eNB) in subsequent subframes, and upon which RBs the data is transmitted. The UL resource grid is comprised of data and UL control information in the Physical Uplink Shared Channel (PUSCH), UL control information in the Physical Uplink Control Channel (PUCCH), and various reference signals such as Demodulation Reference Signals (DMRSs) and Sounding Reference Signals (SRSs). DMRSs are used for coherent demodulation of PUSCH and PUCCH data, whereas SRS is not associated with any data or control information but is generally used to estimate the UL channel quality for purposes of frequency-selective scheduling. An example UL subframe is shown in FIG. 4. Note that UL DMRS and SRS are time-multiplexed into the UL subframe, and SRSs are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (ePDCCH). For Rel-8 to Rel-10 only the Physical Downlink Control Channel (PDCCH) is available. Resource grants are User Equipment (UE) specific and are indicated by scrambling the Downlink Control Information (DCI) Cyclic Redundancy Check (CRC) with the UE-specific Cell Radio Network Temporary Identifier (C-RNTI) identifier.

UL power control in LTE determines the transmit power of different UL physical channels such as PUSCH, PUCCH, and Physical Random Access Channel (PRACH), and reference signals such as SRSs. Closed-loop UL power control is based on whether the UE is transmitting multiple UL channels simultaneously, and the actual transmit power per UL subframe per serving cell for PUSCH is determined using a combination of the UL transmission bandwidth, UL Modulation and Coding Scheme (MCS), higher-layer parameters, and dynamically signaled parameters such as Transmit Power Control (TPC) commands sent on (E)PDCCH, as specified in 3GPP Technical Specification (TS) 36.213. Transmit Power Control (TPC) commands may be sent using DCI Formats 0, 3, 3A, or 4. The maximum transmit power for any UL transmission on a particular cell is generally limited to parameter $P_{CMAX,c}$ which represents the configured maximum UE output power for serving cell c. When multiple CA Component Carriers (CCs) are configured for a particular UE, UL power control is independent for each CC. The TPC commands may either be accumulative (relative adjustments) or absolute values.

The LTE Rel-10 standard supports bandwidths larger than 20 Megahertz (MHz). One requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a CC. In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least the possibility to have, the same structure as a Rel-8 carrier. CA is illustrated in FIG. 5. A CA-capable UE is assigned a PCell which is always activated, and one or more SCells which may be activated or deactivated dynamically.

The number of aggregated CCs as well as the bandwidth of the individual CC may be different for UL and DL. A symmetric configuration refers to the case where the number of CCs in DL and UL is the same whereas an asymmetric configuration refers to the case that the number of CCs is different. Notably, the number of CCs configured in a cell may be different from the number of CCs seen by a terminal. A terminal may for example support more DL CCs than UL CCs, even though the cell is configured with the same number of UL and DL CCs.

In typical deployments of WLAN, Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle.

An example illustration of the LBT mechanism of Wi-Fi is shown in FIG. 6. After a Wi-Fi station A transmits a data frame to a station B, station B shall transmit the Acknowledgement (ACK) frame back to station A with a delay of 16 µs. Such an ACK frame is transmitted by station B without performing a LBT operation. To prevent another station interfering with such an ACK frame transmission, a station shall defer for a duration of 34 µs (referred to as Distributed Inter-Frame Space (DIFS)) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slots. The random backoff counter is selected as a random integer drawn from a uniform distribution over the interval of [0, CW]. The default size of the random backoff contention window, CWmin, is set in the IEEE specifications. Note that collisions can still happen even under this random backoff protocol when there are many stations contending for the channel access. Hence, to avoid recurring collisions, the backoff contention window size CW is doubled whenever the station detects a collision of its transmission up to a limit, CWmax, also set in the IEEE specifications. When a station succeeds in a transmission without collision, it resets its random backoff contention window size back to the default value CWmin.

Up to now, the spectrum used by LTE is dedicated to LTE. This has the advantage that the LTE system does not need to care about the coexistence issue and the spectrum efficiency can be maximized. However, the spectrum allocated to LTE is limited which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 7, a UE is connected to a PCell in the licensed band and one or more SCells in the unlicensed band. A SCell in unlicensed spectrum is denoted herein as a LAA SCell. In the case of standalone operation as in MuLTEfire, no licensed cell is available for UL control signal transmissions.

The Maximum Channel Occupancy Time (MOOT) of a single DL+UL Transmit Opportunity (TXOP) in unlicensed bands is limited by regional regulatory restrictions. The transmit Power Spectral Density (PSD) is also limited, for example, in Europe the lower region of the 5 GHz band is limited to 10 decibel-milliwatts (dBm)/MHz.

In MuLTEfire, Block Interleaved FDMA (B-IFDMA) is the baseline UL transmission scheme used for any UL transmission in unlicensed spectrum. With B-IFDMA, one carrier is divided into N interlaces, each interlace consisting of M equally spaced physical RBs (M=10 for both 10 MHz and 20 MHz carrier). This design offers a good tradeoff between satisfaction of regulatory requirements on occupied bandwidth and transmit PSD and degradation in single-carrier properties of the UL signal. An example with N=6 is shown in FIG. 8, where the different numbers correspond to different interlaces, and R0, R1, . . . , R5 correspond to DMRS for each interlace. A similar B-IFDMA design is currently under discussion for UL LAA.

Two forms of PUCCH transmission have been defined for MuLTEfire: a short PUCCH (sPUCCH) comprising between two to six symbols in time, and a longer, enhanced PUCCH (ePUCCH) which spans one subframe in time, as shown in FIG. 9. The sPUCCH occurs immediately after the Downlink Pilot Time Slot (DwPTS) portion of a partial DL subframe as indicated by Common PDCCH (C-PDCCH) signaling from Rel-13 LAA, while the ePUCCH can be multiplexed with PUSCH transmissions in 1-ms UL subframes. For the triggering of ePUCCH transmissions, both common PDCCH (C-PDCCH) or UL grant (DCI based) based triggers are supported. The eNB can use either or both mechanisms.

Regarding UL scheduling in MuLTEfire, the UL grant and the corresponding UL transmission(s) do not need to be contained within the same TXOP. The following procedures are supported when scheduling UL transmissions across TXOPs:

Option 1: eNB schedules UE with a fixed time relationship between grants and transmission, where the delay between grant and start of UL transmission can be 4 ms or longer. The eNB may signal the type of LBT to be performed by the UE in the grant (e.g., 25 μs or Cat-4 LBT depending on transmission time relative to TXOP limit).

Option 2: eNB schedules UE without a fixed time relationship between grant and UL transmission. UE transmits after a minimum delay m1 since the grant was received, m1>=4 ms, and only after further receiving a trigger sent by eNB on the C-PDCCH. The UL LBT is 25 μs in this case. If the C-PDCCH trigger is not received within a time m2, the UE does not transmit and drops the grant. The parameter m1 is carried in the UL grant, while parameter m2 is configured using higher-layer signaling.

Multi-Subframe (MSF) scheduling is also supported in MuLTEfire, where a single UL grant in a DL subframe can be used to schedule a UL transmission burst spanning multiple UL subframes. This feature is also expected to be supported in Rel-14 enhanced LAA (eLAA).

SUMMARY

Systems and methods relating to transmit power control are disclosed. In some embodiments, a method of operation of a radio access node for providing transmit power control commands to a wireless device for uplink transmission on a cell that operates in an unlicensed frequency spectrum is provided. The method comprises indicating, for the cell that operates in the unlicensed frequency spectrum, a dynamic transmit power control command using a downlink control channel which indicates a downlink-uplink allocation of upcoming subframes in the cell that operates in the unlicensed frequency spectrum. In some embodiments, the downlink control channel is a common downlink control channel. In some other embodiments, the downlink channel is a common physical downlink control channel.

In some embodiments, indicating the dynamic transmit power control command comprises transmitting the downlink control channel comprising an indication of the downlink-uplink allocation of upcoming subframes in the cell and an indication of the dynamic transmit power control command, wherein the indication of the dynamic transmit power control command comprises at least one bit.

In some embodiments, the dynamic transmit power control command is applicable to Physical Uplink Shared Channel (PUSCH), short Physical Uplink Control Channel (PUCCH) (sPUCCH), enhanced PUCCH (ePUCCH), and/or Sounding Reference Signal (SRS) transmissions.

In some embodiments, the radio access node is a License Assisted Access (LAA) radio access node. In some other embodiments, the radio access node is a MuLTEfire (MF) Access Point (AP).

Embodiments of a radio access node for providing transmit power control commands to a wireless device for uplink transmission on a cell that operates in an unlicensed frequency spectrum are also disclosed. In some embodiments, the radio access node is adapted to indicate, for the cell that operates in the unlicensed frequency spectrum, a dynamic transmit power control command using a downlink control channel which indicates a downlink-uplink allocation of upcoming subframes in the cell that operates in the unlicensed frequency spectrum. In some embodiments, the downlink control channel is a common downlink control channel. In some other embodiments, the downlink channel is a common physical downlink control channel.

In some embodiments, the radio access node is adapted to indicate the dynamic transmit power control command by transmitting the downlink control channel comprising an indication of the downlink-uplink allocation of upcoming subframes in the cell and an indication of the dynamic transmit power control command, wherein the indication of the dynamic transmit power control command comprises at least one bit.

In some embodiments, the dynamic transmit power control command is applicable to PUSCH, sPUCCH, ePUCCH, and/or SRS transmissions.

In some embodiments, the radio access node is a LAA radio access node. In some other embodiments, the radio access node is a MF AP.

Embodiments of a computer program are disclosed. In some embodiments, the computer program comprises instructions which, when executed on at least one processor, cause the at least one processor to carry out the method of operation of a radio access node according to any one of the embodiments disclosed herein. Embodiments of a carrier containing the aforementioned computer program are also disclosed, wherein the carrier is one of an electronic signal, an optical signal, a radio signal, or a computer readable storage medium.

In some embodiments, a radio access node for providing transmit power control commands to a wireless device for uplink transmission on a cell that operates in an unlicensed frequency spectrum comprises a processor and memory. The memory comprises instructions executable by the processor whereby the radio access node is operable to indicate, for the cell that operates in the unlicensed frequency spectrum, a dynamic transmit power control command using a downlink control channel which indicates a downlink-uplink allocation of upcoming subframes in the cell that operates in the unlicensed frequency spectrum.

In some embodiments, a radio access node for providing transmit power control commands to a wireless device for uplink transmission on a cell that operates in an unlicensed frequency spectrum comprises one or more modules operable to perform the method of operation of a radio access node according to any one of the embodiments disclosed herein.

Embodiments of a method of operation of a wireless device for uplink transmission on a cell that operates in an unlicensed frequency spectrum are also disclosed. In some embodiments, the method comprises receiving, from a radio access node serving the cell that operates in the unlicensed frequency spectrum, an indication of a dynamic transmit power control command for the cell that operates in the unlicensed frequency spectrum, the indication of the dynamic transmit power control command being comprised in a downlink control channel that also comprises an indication of a downlink-uplink allocation of upcoming subframes in the cell that operates in the unlicensed frequency spectrum.

In some embodiments, the method further comprises utilizing the indication of the dynamic transmit power control command for uplink transmission on the cell that operates in the unlicensed frequency spectrum. Further, in some embodiments, utilizing the indication of the dynamic transmit power control command comprises performing a Listen-Before-Talk (LBT) procedure for the cell that operates in the unlicensed frequency spectrum and transmitting an uplink transmission on the cell that operates in the unlicensed frequency spectrum if a result of the LBT procedure is a decision that a corresponding channel is clear.

In some embodiments, the downlink control channel is a common downlink control channel. In some other embodiments, the downlink control channel is a common physical downlink control channel.

In some embodiments, the dynamic transmit power control command is applicable to PUSCH, sPUCCH, ePUCCH, and/or SRS transmissions.

In some embodiments, the radio access node is a LAA radio access node. In some other embodiments, the radio access node is a MF AP.

Embodiments of a wireless device operative to perform uplink transmission on a cell that operates in an unlicensed frequency spectrum are also disclosed. In some embodiments, the wireless device is adapted to receive, from a radio access node serving the cell that operates in the unlicensed frequency spectrum, an indication of a dynamic transmit power control command for the cell that operates in the unlicensed frequency spectrum, the indication of the dynamic transmit power control command being comprised in a downlink control channel that also comprises an indication of a downlink-uplink allocation of upcoming subframes in the cell that operates in the unlicensed frequency spectrum.

In some embodiments, the wireless device is further adapted to utilize the indication of the dynamic transmit power control command for uplink transmission on the cell that operates in the unlicensed frequency spectrum. Further, in some embodiments, utilizing the indication of the dynamic transmit power control command comprises performing a LBT procedure for the cell that operates in the unlicensed frequency spectrum and transmitting an uplink transmission on the cell that operates in the unlicensed frequency spectrum if a result of the LBT procedure is a decision that a corresponding channel is clear.

In some embodiments, the downlink control channel is a common downlink control channel. In some other embodiments, the downlink control channel is a common physical downlink control channel.

In some embodiments, the dynamic transmit power control command is applicable to PUSCH, sPUCCH, ePUCCH, and/or SRS transmissions.

In some embodiments, the radio access node is a LAA radio access node. In some other embodiments, the radio access node is a MF AP.

In some embodiments, a wireless device operative to perform uplink transmission on a cell that operates in an unlicensed frequency spectrum, comprises a processor and memory. The memory comprises instructions executable by the processor whereby the wireless device is operable to receive, from a radio access node serving the cell that operates in the unlicensed frequency spectrum, an indication of a dynamic transmit power control command for the cell that operates in the unlicensed frequency spectrum, the indication of the dynamic transmit power control command being comprised in a downlink control channel that also comprises an indication of a downlink-uplink allocation of upcoming subframes in the cell that operates in the unlicensed frequency spectrum.

In some embodiments, a wireless device operative to perform uplink transmission on a cell that operates in an unlicensed frequency spectrum comprises one or more modules operable to perform the method of operation of a wireless device according to any one of the embodiments disclosed herein.

In some other embodiments, a method of operation of a wireless device for uplink transmission on a cell that operates in an unlicensed frequency spectrum comprises setting one or more uplink power control parameters for autonomous uplink transmission on the cell that operates in the unlicensed frequency spectrum based on uplink power control information comprised in a most recent downlink control channel received by the wireless device, uplink power control information comprised in a most recent uplink grant received by the wireless device, or signaling received on another serving cell of the wireless device.

In some embodiments, the method further comprises transmitting an autonomous uplink transmission on the cell that operates in the unlicensed frequency spectrum in accordance with the one or more uplink power control parameters.

In some embodiments, setting the one or more uplink power control parameters comprises setting the one or more uplink power control parameters for autonomous uplink transmission on the cell that operates in the unlicensed frequency spectrum based on uplink power control information comprised in a most recent downlink control channel received by the wireless device. In some embodiments, the most recent downlink control channel is a common downlink control channel. In some other embodiments, the most recent downlink control channel is a common physical downlink control channel.

In some embodiments, setting the one or more uplink power control parameters comprises setting the one or more uplink power control parameters for autonomous uplink transmission on the cell that operates in the unlicensed frequency spectrum based on uplink power control information comprised in a most recent uplink grant received by the wireless device.

In some embodiments, setting the one or more uplink power control parameters comprises setting the one or more uplink power control parameters for autonomous uplink transmission on the cell that operates in the unlicensed frequency spectrum based on signaling received on another serving cell of the wireless device.

In some embodiments, the cell that operates in the unlicensed frequency spectrum is a secondary cell of the wireless device that serves the wireless device together with a Primary Cell (PCell) of the wireless device that operates in a licensed frequency spectrum in accordance with a Carrier Aggregation (CA) scheme. In some other embodiments, the cell that operates in the unlicensed frequency spectrum is a standalone serving cell of the wireless device.

In some embodiments, a wireless device operative to perform uplink transmission on a cell that operates in an unlicensed frequency spectrum is provided. The wireless device is adapted to set one or more uplink power control parameters for autonomous uplink transmission on the cell that operates in the unlicensed frequency spectrum based on uplink power control information comprised in a most recent downlink control channel received by the wireless device, uplink power control information comprised in a most recent uplink grant received by the wireless device, or signaling received on another serving cell of the wireless device.

In some embodiments, the wireless device is further adapted to transmit an autonomous uplink transmission on the cell that operates in the unlicensed frequency spectrum in accordance with the one or more uplink power control parameters.

In some embodiments, the wireless device is further adapted to set the one or more uplink power control parameters by setting the one or more uplink power control parameters for autonomous uplink transmission on the cell that operates in the unlicensed frequency spectrum based on uplink power control information comprised in a most recent downlink control channel received by the wireless device. In some embodiments, the most recent downlink control channel is a common downlink control channel. In some other embodiments, the most recent downlink control channel is a common physical downlink control channel.

In some embodiments, the wireless device is further adapted to set the one or more uplink power control parameters comprises setting the one or more uplink power control parameters for autonomous uplink transmission on the cell that operates in the unlicensed frequency spectrum based on uplink power control information comprised in a most recent uplink grant received by the wireless device.

In some embodiments, the wireless device is further adapted to set the one or more uplink power control parameters comprises setting the one or more uplink power control parameters for autonomous uplink transmission on the cell that operates in the unlicensed frequency spectrum based on signaling received on another serving cell of the wireless device.

In some embodiments, the cell that operates in the unlicensed frequency spectrum is a Secondary Cell (SCell) of the wireless device that serves the wireless device together with a PCell of the wireless device that operates in a licensed frequency spectrum in accordance with a CA scheme. In some other embodiments, the cell that operates in the unlicensed frequency spectrum is a standalone serving cell of the wireless device.

In some embodiments, a wireless device operative to perform uplink transmission on a cell that operates in an unlicensed frequency spectrum comprises a processor and memory. The memory comprises instructions executable by the processor whereby the wireless device is operable to set one or more uplink power control parameters for autonomous uplink transmission on the cell that operates in the unlicensed frequency spectrum based on: uplink power control information comprised in a most recent downlink control channel received by the wireless device, uplink power control information comprised in a most recent uplink grant received by the wireless device, or signaling received on another serving cell of the wireless device.

In some embodiments, a wireless device operative to perform uplink transmission on a cell that operates in an unlicensed frequency spectrum comprising one or more modules operable to perform the method of operation of a wireless device according to any one of the embodiments disclosed herein.

Embodiments of a computer program comprising instructions are also disclosed. In some embodiments, the computer program comprises instructions which, when executed on at least one processor, cause the at least one processor to carry out the method of operation of a wireless device according to any one of the embodiments disclosed herein. Embodiments of a carrier are also disclosed in which a carrier containing the aforementioned computer program is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Certain embodiments are provided in recognition of shortcomings of conventional approaches. One such shortcoming is that the combination of transmit Power Spectral Density (PSD) constraints in unlicensed bands and new features such as Multi-Subframe (MSF) scheduling introduce new challenges that are not well addressed with existing power control solutions. For example, coexistence with adjacent nodes of the same or another technology can be degraded when every User Equipment device (UE) that is scheduled in an uplink (UL) subframe utilizes the maximum allowed transmit power for that carrier.

In certain embodiments, an enhanced or evolved Node B (eNB) provides dynamic signaling of the UL/downlink (DL) allocation of upcoming subframes. This would be applicable to systems such as, e.g., MuLTEfire, Release (Rel) 14 enhanced License Assisted Access (eLAA), Long Term Evolution (LTE) in Rel-14 and beyond with MSF grant support, other versions of LTE in unlicensed bands, and Next Generation (NX)/Fifth Generation (5G) systems in unlicensed spectrum.

The described embodiments may provide various potential benefits compared to conventional approaches, such as improving the efficiency of UL power control on unlicensed carriers, and improving coexistence of UL transmissions with adjacent nodes of the same or another technology.

Certain embodiments relate to UL power control for UL transmissions on unlicensed bands. These transmissions may be carried on a Primary Cell (PCell) or Secondary Cell (SCell) in the case of Carrier Aggregation (CA) operation, or on Master eNB (MeNB) or Secondary eNB (SeNB) in case of dual connectivity, and may be sent in one or more successive UL subframes.

Figure 1:
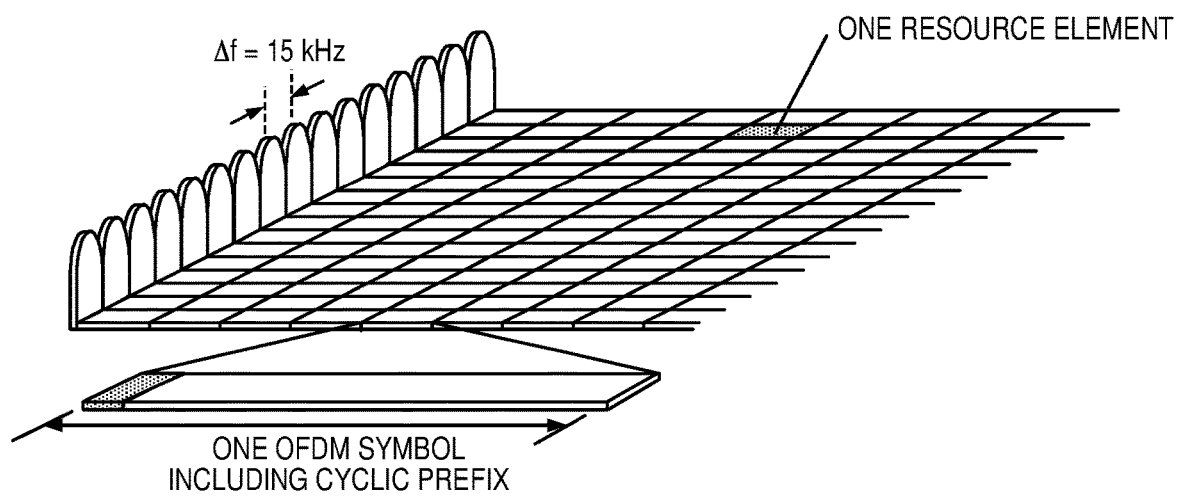
FIG. 1 illustrates a Long Term Evolution (LTE) downlink (DL) physical resource.
Figure 2:
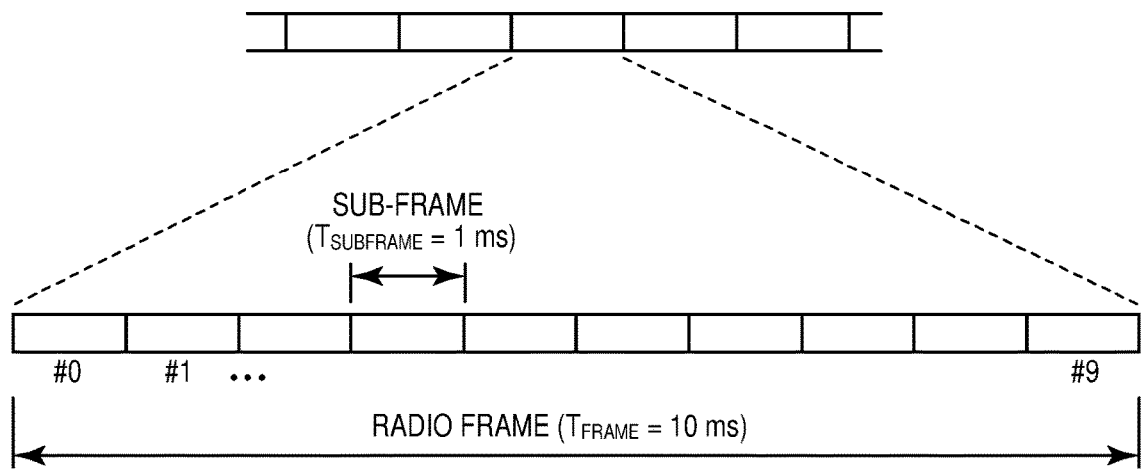
FIG. 2 illustrates an LTE time-domain structure.
Figure 3:
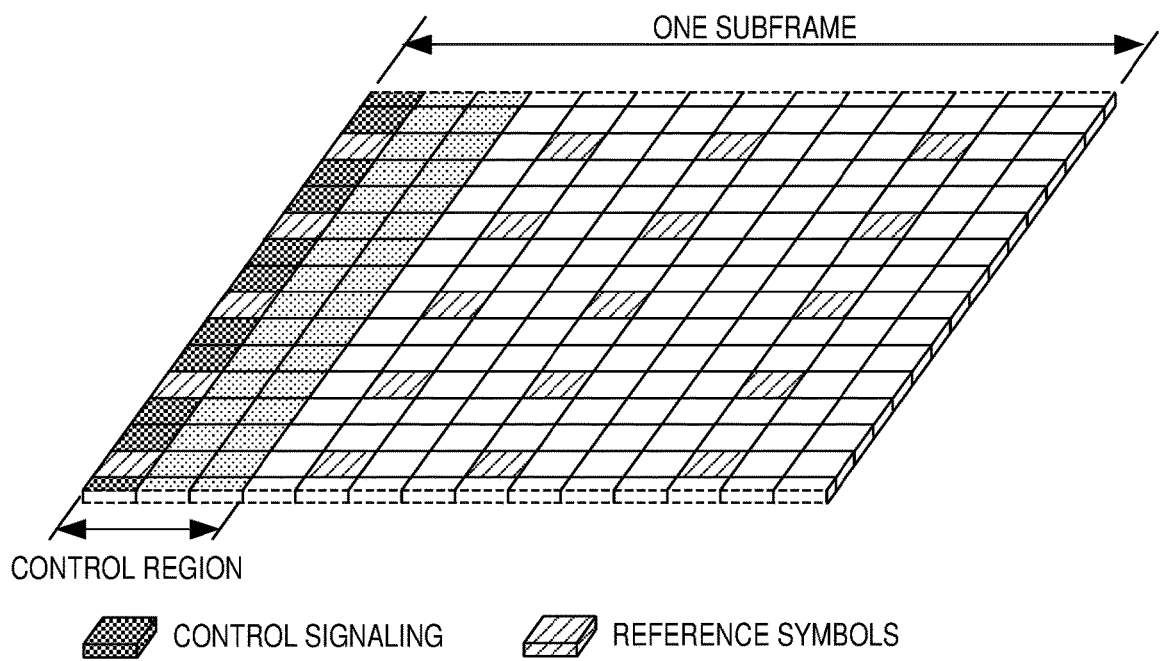
FIG. 3 illustrates an LTE DL subframe.
Figure 4:
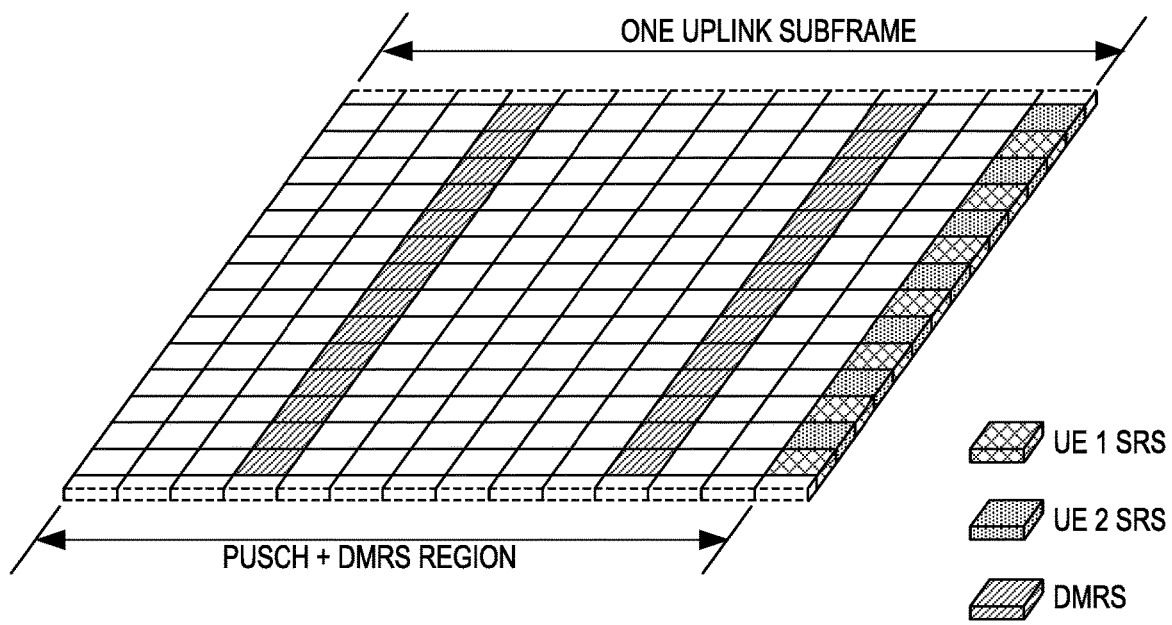
FIG. 4 illustrates a Release (Rel) 12 uplink (UL) subframe.
Figure 5:
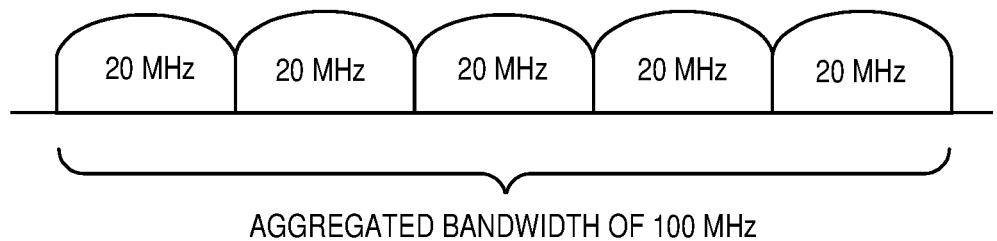
FIG. 5 illustrates Carrier Aggregation (CA).
Figure 7:
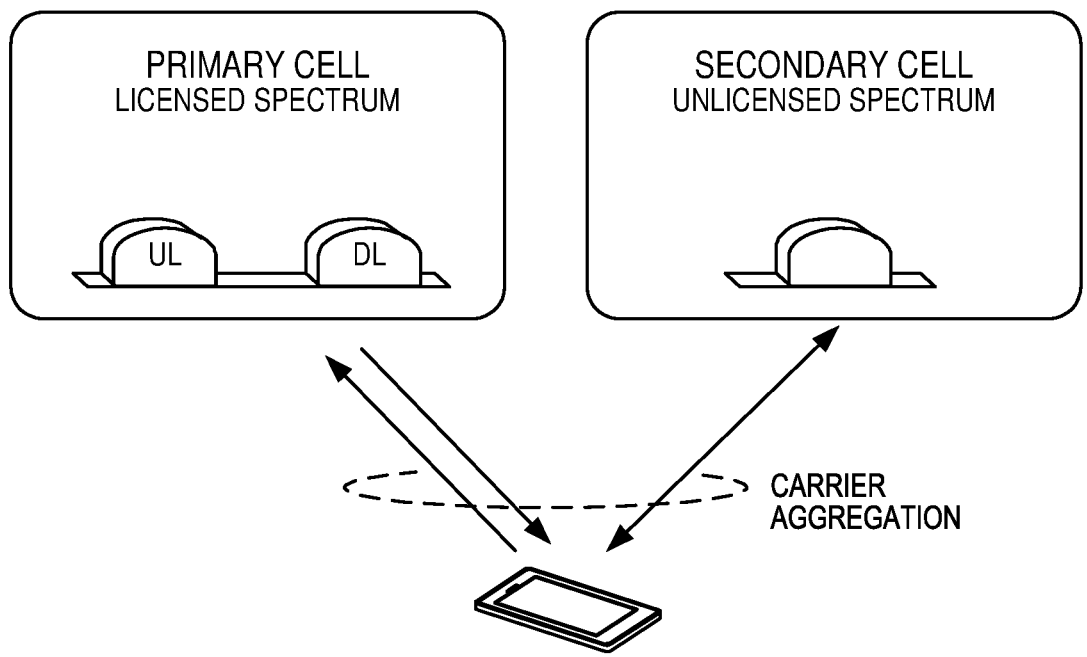
FIG. 7 illustrates License Assisted Access (LAA) to unlicensed spectrum using LTE CA.
Figure 6:
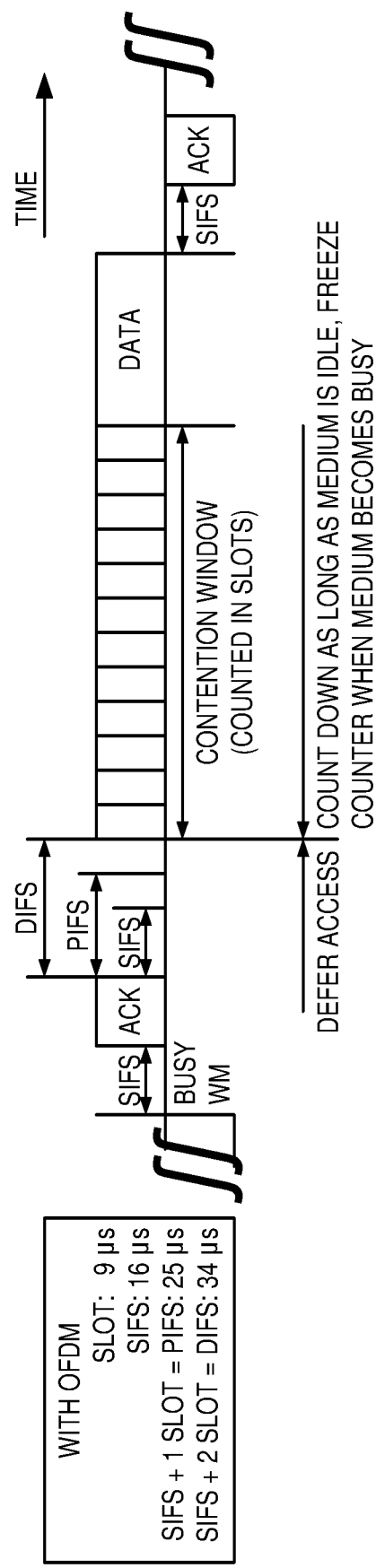
FIG. 6 illustrates Listen-Before-Talk (LBT) in Wi-Fi.
Figure 8:
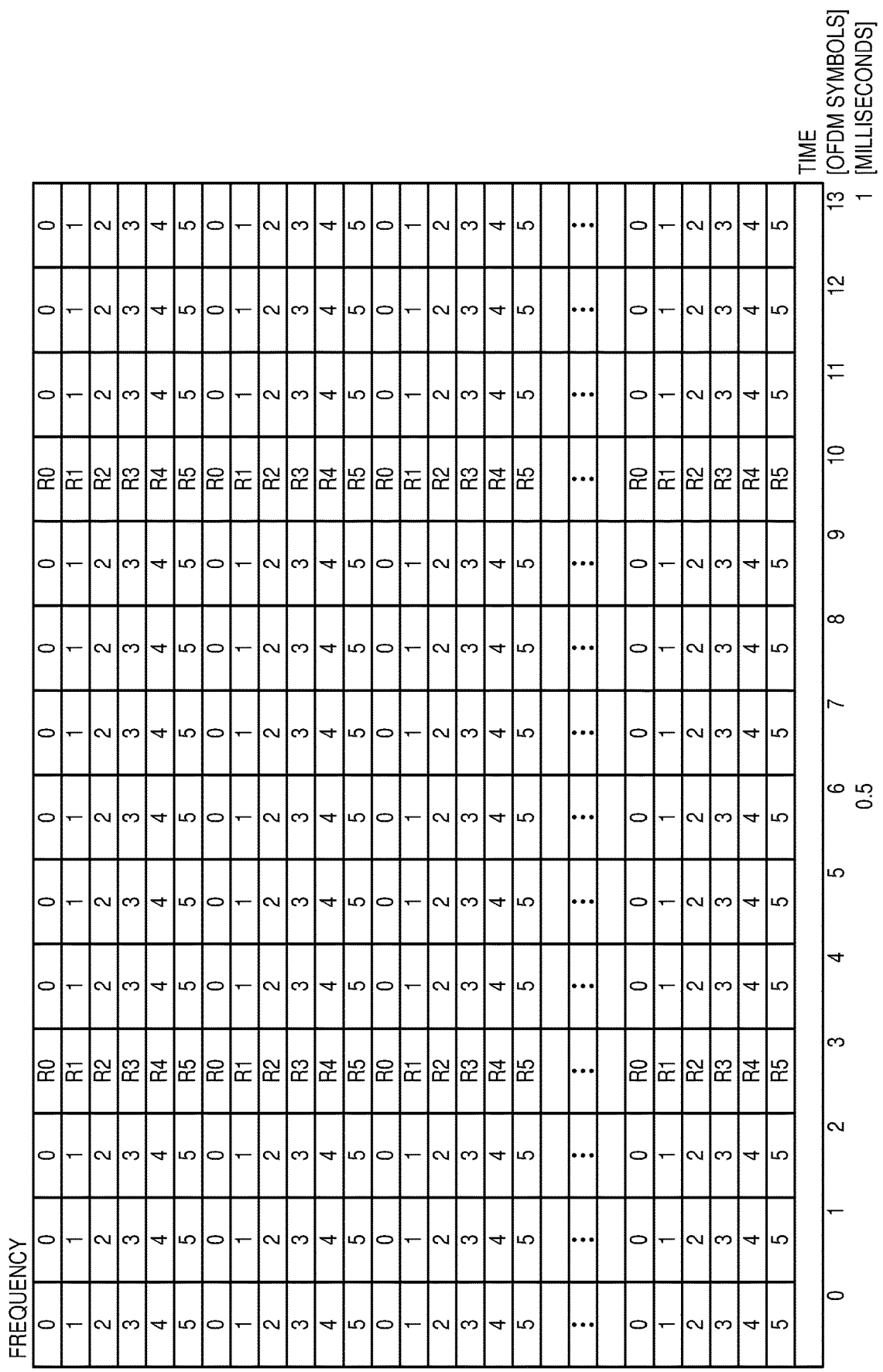
FIG. 8 illustrates a UL Block Interleaved Frequency Division Multiple Access (B-IFDMA) structure in one UL subframe with Resource Block (RB)-level interlacing, one Demodulation Reference Signal (DMRS) per slot, and a total of six interlaces for the system.
Figure 9:
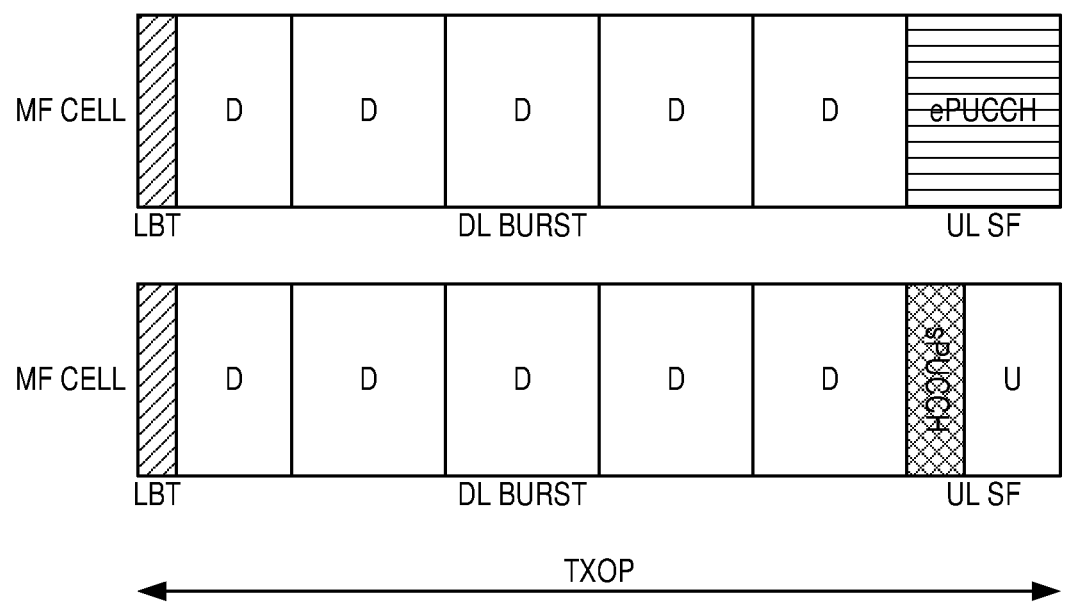
FIG. 9 illustrates examples of enhanced Physical Uplink Control Channel (ePUCCH) and short Physical Uplink Control Channel (sPUCCH) within a Transmit Opportunity (TXOP).
Figure 10:
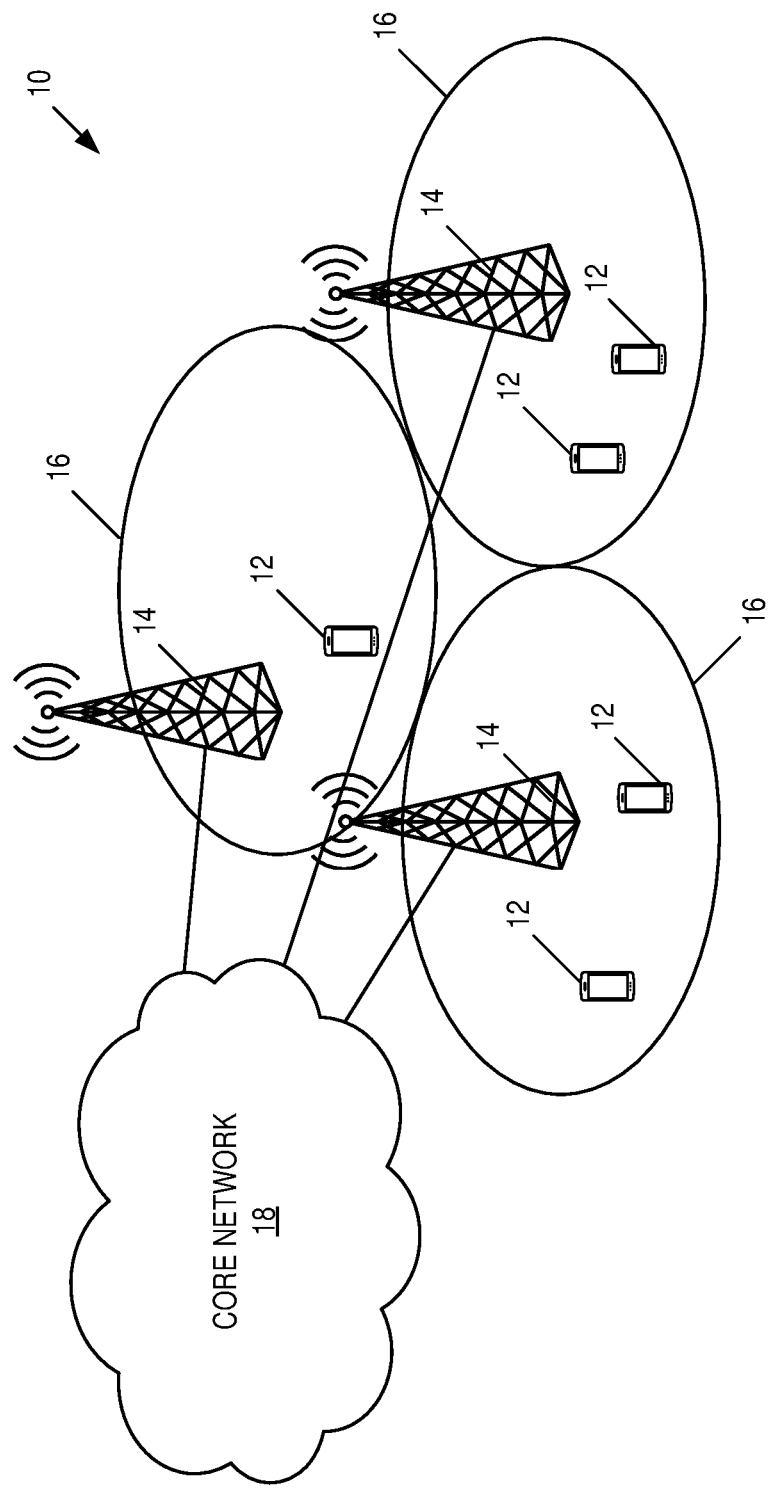
FIG. 10 is a diagram illustrating one example of an LTE network in which embodiments of the present disclosure may be implemented.

FIG. 10 illustrates one example of a communication network 10 in which embodiments of the present disclosure may be implemented. As illustrated, the communication network 10 comprises a plurality of wireless communication devices 12 (e.g., conventional UEs, Machine Type Communication (MTC)/Machine-to-Machine (M2M) UEs) and a plurality of radio access nodes 14 (e.g., eNBs or other base stations). The wireless communication devices 12 are also referred to herein as wireless devices 12. The communication network 10 is organized into cells 16, which are connected to a core network 18 via the corresponding radio access nodes 14. The radio access nodes 14 are capable of communicating with the wireless devices 12 along with any additional elements suitable to support communication between wireless devices 12 or between a wireless device 12 and another communication device (such as a landline telephone).

Figure 11A:
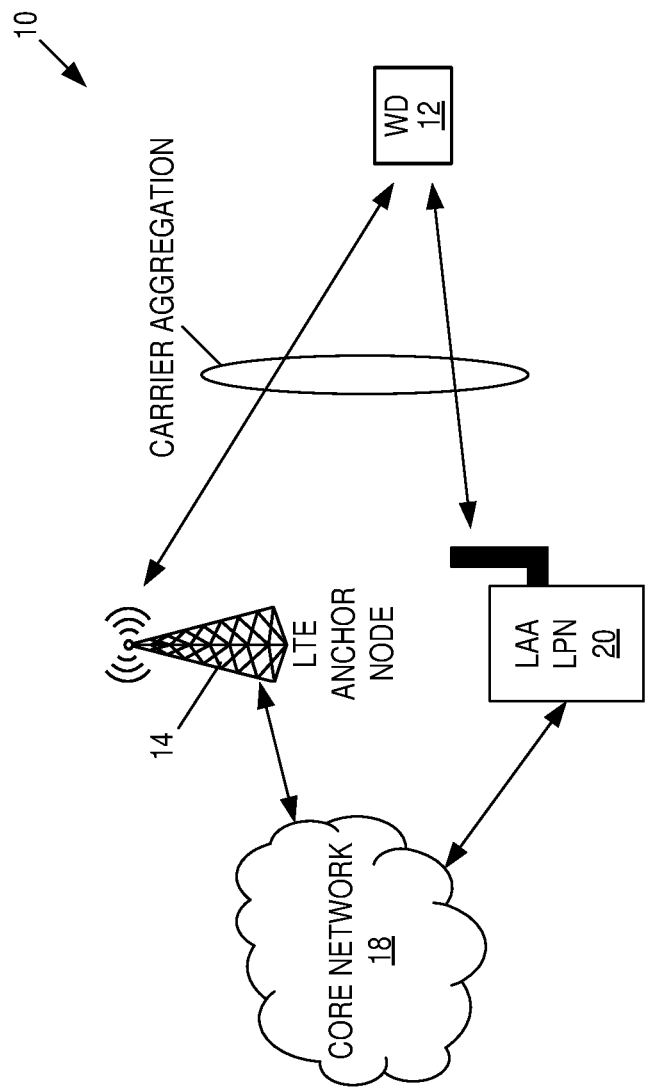
FIGS. 11A and 11B illustrate examples of a LAA implementation of an LTE network using a Secondary Cell (SCell) in an unlicensed spectrum and a MuLTEfire implementation of LTE technology in unlicensed spectrum in which embodiments of the present disclosure may be implemented.

As discussed above, embodiments of the present disclosure are applicable to, e.g., MuLTEfire, Rel-14 eLAA, LTE in Rel-14 and beyond with MSF grant support, other versions of LTE in unlicensed bands, and NX/5G systems in unlicensed spectrum. In this regard, FIG. 11A illustrates one example in which the communication network 10 implements eLAA according to some embodiments of the present disclosure. As illustrated, a radio access node 14, which in this example is referred to as an LTE anchor node (e.g., an eNB), serves a PCell of a wireless device 12, where the PCell operates on a primary carrier in a licensed frequency spectrum. Another radio access node, which in this example is referred to as a License Assisted Access (LAA) Low-Power Node (LPN) 20, serves a SCell of the wireless device 12, where the SCell operates on a secondary carrier in an unlicensed frequency spectrum. The wireless device 12 is served by both the LTE anchor node 14 and the LAA LPN 20 using a CA scheme, as is understood by one skilled in the art.

Figure 11B:
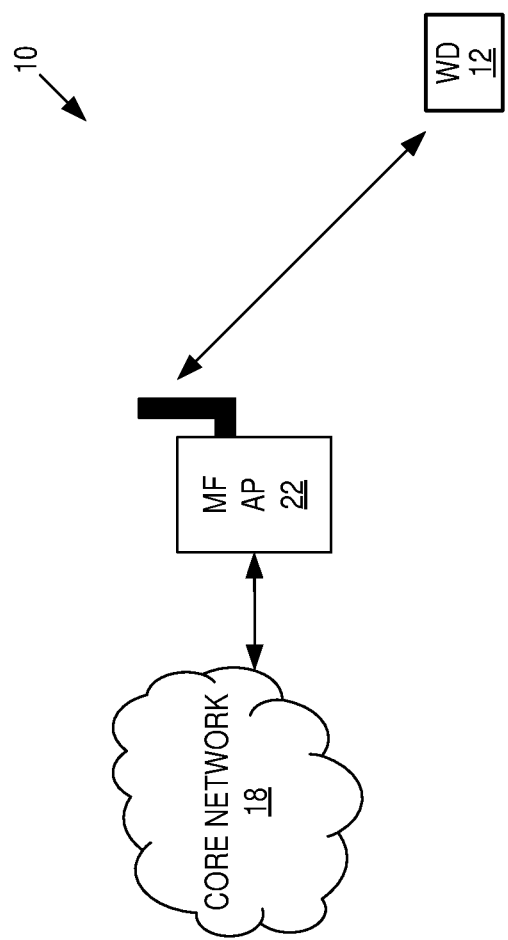

FIG. 11B illustrates another example, in which the communication network 10 implements LTE technology in an unlicensed frequency spectrum. In particular, in this example, a radio access node is implemented as a MuLTE-fire (MF) Access Point (AP) 22 that serves a serving cell of the wireless device 12, where the cell operates on a carrier in the unlicensed frequency spectrum.

Various embodiments of the operation of a wireless device 12 and a radio access node 24 (e.g., the radio access node 14, the LAA LPN 20, or the MF AP 22) will now be described with respect to FIGS. 12 through 16.

In a first embodiment, a MSF UL scheduling scenario is considered where a single grant from the eNB schedules Physical Uplink Shared Channel (PUSCH) and/or enhanced Physical Uplink Control Channel (ePUCCH) transmissions by a particular UE in L UL subframes, and where the L UL subframes may be non-consecutive. In one variation of this embodiment, the eNB may indicate multiple dynamic UL Transmit Power Control (TPC) commands corresponding to different UL subframes scheduled using the same grant, for example, L TPC commands in the same grant. This can be useful for example when different numbers of UEs are multiplexed in the L UL subframes and the eNB desires to limit the total UE transmit power radiated from all UEs in each subframe. In another variation of this embodiment, if the UE is configured to use accumulative TPC commands and a particular UL transmission in one of the scheduled subframes fails due to unsuccessful Listen-Before-Talk (LBT), then the UE continues to accumulate the indicated TPC command for that UL subframe prior to its next UL transmission attempt in a later UL subframe. In yet another variation of this embodiment, the switch between accumulative and absolute TPC is indicated dynamically in the MSF grant. In still another aspect of this embodiment, if the MSF grant also includes a joint grant for multiple unlicensed carriers, then additional TPC commands may be included corresponding to each unlicensed carrier.

Figure 12:
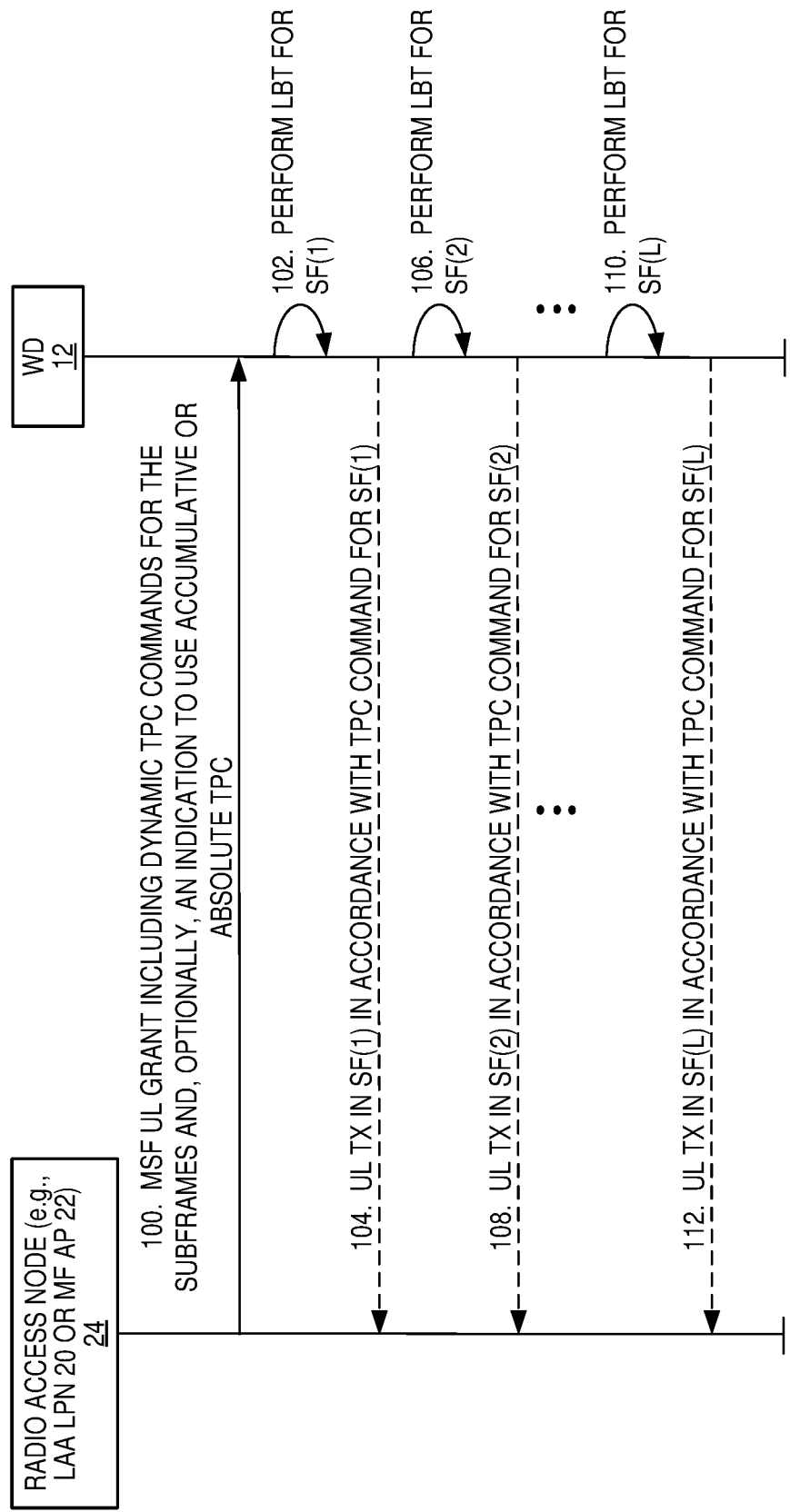
FIG. 12 illustrates the operation of a radio access node and a wireless device according to some embodiments of the present disclosure.

FIG. 12 illustrates at least some of the aspects of the first embodiment described above. Optional steps are indicated with dashed lines. As discussed above, the radio access node 24 transmits a MSF UL grant to the wireless device 12 (step 100). The MSF UL grant is a UL grant for L subframes, where L≥2. The L subframes may not be consecutive subframes. As an example, for eLAA, the MSF UL grant may be transmitted by the radio access node 14 (e.g., LTE anchor node 20 such as an eNB) on the PCell of the wireless device 12, where the MSF UL grant is a grant for transmission in the L subframes on a SCell served by the LAA LPN 20 in the unlicensed frequency spectrum. Conversely, for MF, the MSF grant may be transmitted by the MF AP 22.

The MSF UL grant includes dynamic TPC commands for the L subframes (i.e., a dynamic TPC command for each of the L subframes). In this manner, the TPC commands can be dynamically sent for each subframe in each MSF UL grant. Further, in some embodiments, the MSF UL grant may be a joint grant for multiple carriers (e.g., multiple SCells operating in the unlicensed frequency spectrum), and the MSF UL grant includes dynamic TPC commands for each of those carriers. For example, if the L subframes include M subframes on carrier 1 and N subframes on carrier 2, then the MSF UL grant includes M TPC commands for the M subframes on carrier 1 and N TPC commands for the N subframes on carrier 2. Optionally, the MSF UL grant also includes an indication as to whether the dynamic TPC commands are accumulative or absolute TPC commands (i.e., an indication to the wireless device 12 as to whether to use accumulative or absolute TPC).

Based on the MSF UL grant, the wireless device 12 performs an LBT procedure to determine whether the wireless device 12 is permitted to transmit in SF(1), where SF(1) denotes the first subframe of the L subframes scheduled in the MSF UL grant (step 102). If the LBT procedure results in a decision that the corresponding channel in the unlicensed spectrum is clear, the wireless device 12 transmits a UL transmission in SF(1) in accordance with the TPC command for SF(1) included in the MSF UL grant (step 104). Notably, for eLAA, the UL transmission may be to a radio access node (e.g., the LAA LPN 20) other than the radio access node 24 that transmitted the MSF UL grant. In some embodiments, if accumulative TPC is used and the LBT procedure results in a decision that the corresponding channel in the unlicensed frequency spectrum is not clear, the wireless device 12 continues to accumulate the indicated TPC command for SF(1) prior to its next UL transmission attempt in SF(2) (i.e., the second subframe scheduled by the MSF UL grant). The wireless device 12 continues in this manner to perform LBT and transmit if the channel is clear for SF(2) through SF(L), which are the second through last subframes scheduled in the MSF UL grant (steps 106-112).

In a second embodiment, cell-specific dynamic TPC commands are indicated by the eNB using the Common Physical Downlink Control Channel (C-PDCCH) which indicates the DL-UL allocation of upcoming subframes. As a non-limiting example, 2 bits or 1 bit may be used for such indications, similar to Downlink Control Information (DCI) Formats 3 and 3A, respectively. These TPC commands may either be accumulative or absolute, and may be applicable to PUSCH, short PUCCH (sPUCCH), ePUCCH, or Sounding Reference Signal (SRS) transmissions.

Figure 13:
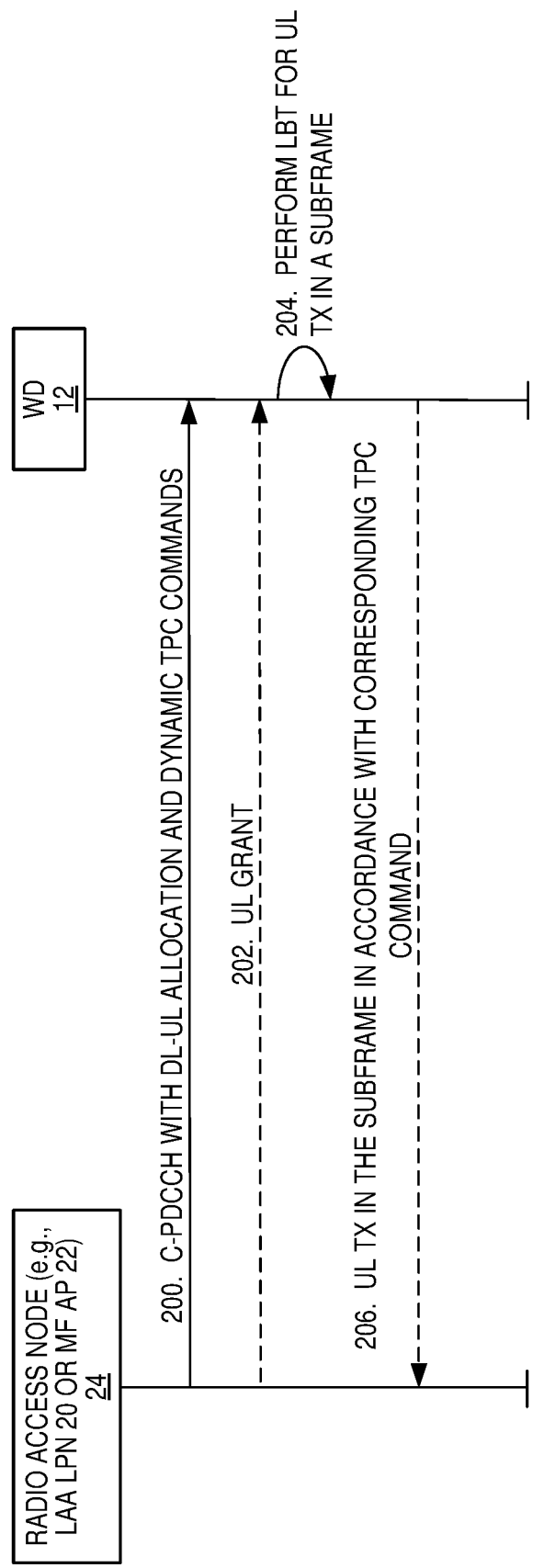
FIG. 13 illustrates the operation of a radio access node and a wireless device according to some other embodiments of the present disclosure.

FIG. 13 illustrates at least some of the aspects of the second embodiment described above. As discussed above, in the second embodiment, the radio access node 24 transmits a DL control channel (e.g., a C-PDCCH) that includes both an indication of a DL-UL allocation of upcoming subframes and dynamic TPC commands for, e.g., the subframes allocated as UL subframes (step 200). As an example, for MF, the radio access node 24 is the MF AP 22, and the MF AP 22 transmits the C-PDCCH or a DL control channel that indicates the DL-UL allocation for upcoming subframes and dynamic TPC commands applicable to, e.g., PUSCH, sPUCCH, ePUCCH, or SRS transmissions. As another example, for eLAA, the radio access node 24 may be the LTE anchor node 14, where the LTE anchor node 14 transmits the C-PDCCH or DL control channel on the PCell of the wireless device 12 in the licensed spectrum.

In some embodiments, the radio access node 24 transmits a UL grant to the wireless device 12 for transmission in the unlicensed spectrum (step 202). The wireless device 12 performs an LBT procedure to determine whether the corresponding channel is available for transmission, e.g., in the granted UL subframe (step 204). If the channel is clear, the wireless device 12 transmits a UL transmission in a UL subframe in accordance with the corresponding TPC command that was previously received by the wireless device 12 in the C-PDCCH (step 206). In the example of FIG. 13, the UL transmission is shown as being transmitted to the same radio access node 24 that transmitted the C-PDCCH. This may be true for MF. However, for eLAA, the C-PDCCH may be transmitted by the LTE anchor node 14 on the PCell of the wireless device 12, and the wireless device 12 transmits the UL transmission to the LAA LPN 20 on a SCell that operates in the unlicensed spectrum.

A third embodiment addresses the case where the UE is configured with autonomous UL transmission capability, i.e., the UE can perform UL transmissions without an explicit UL grant from the serving cell. In one aspect of this embodiment, the UE sets its UL power control parameters based on the most recent C-PDCCH or UL grant power control information received by it. In another aspect, the UE that performs autonomous UL transmissions on serving cell c sets its power control parameters based on signaling received on another serving cell c'.

Figure 14:
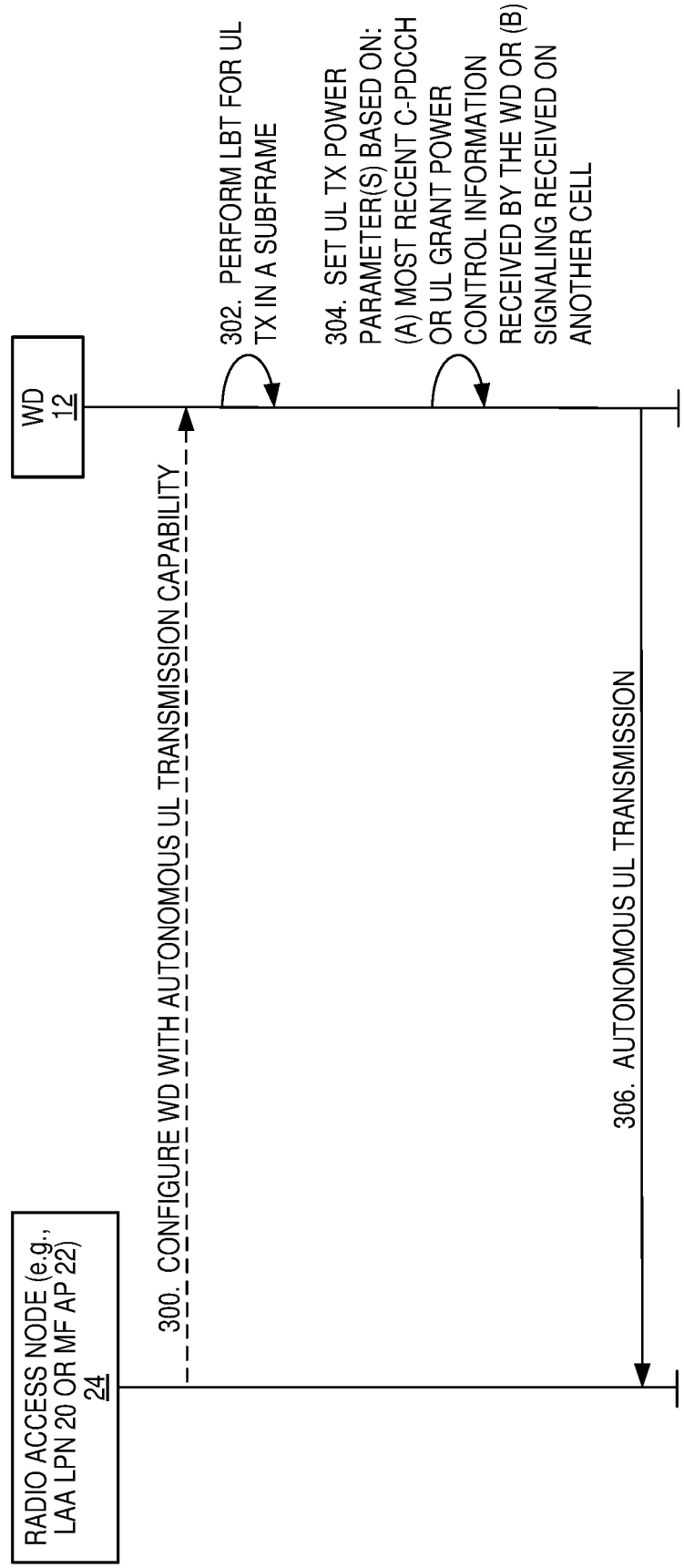
FIG. 14 illustrates the operation of a radio access node and a wireless device according to some other embodiments of the present disclosure.

FIG. 14 illustrates at least some of the aspects of the third embodiment described above. As illustrated, optionally, the radio access node 24 configures the wireless device 12 with autonomous UL transmission capability (step 300). Alternatively, the wireless device 12 may be preconfigured with autonomous UL transmission capability or may be configured with autonomous UL transmission capability by another network node. When the wireless device 12 autonomously determines that it would like to perform UL transmission, the wireless device 12 performs a UL LBT procedure to determine whether the channel in the unlicensed spectrum is clear for a UL transmission from the wireless device 12 in a particular UL subframe (step 302). If the channel is clear, the wireless device 12 sets one or more UL transmit power parameters based on either (A) a most recent C-PDCCH or UL grant power control information received by the wireless device 12 or (B) signaling received by the wireless device 12 on another cell, depending on the particular embodiment (step 304). For example, in some embodiments, a dynamic TPC for autonomous UL transmissions is included in a C-PDCCH transmission or other DL control channel transmission to the wireless device 12. The wireless device 12 then uses the TPC command for autonomous UL transmission received in the most recent C-PDCCH transmission (or other DL control channel transmission) to set the UL transmit power parameter(s) in step 304. As another example, the wireless device 12 may (re-)use the TPC command received in a most recent UL grant received by the wireless device 12 to set the UL transmit power parameter(s) for the autonomous UL transmission in step 304. As yet another example, a dynamic TPC command for autonomous UL transmission on this cell c may be transmitted to the wireless device 12 using signaling on c'. The wireless device 12 then transmits the autonomous UL transmission on the cell in the unlicensed spectrum in accordance with the UL transmit power parameter(s) set in step 304 (step 306).

In a fourth embodiment, a UE configured with a MSF grant may send a Power Headroom Report (PHR) in some or all of such said subframes, depending on eNB configuration. In one variation of this embodiment, the UE may send only the PHR corresponding to the subframe with the highest PUSCH transmission power.

Figure 15:
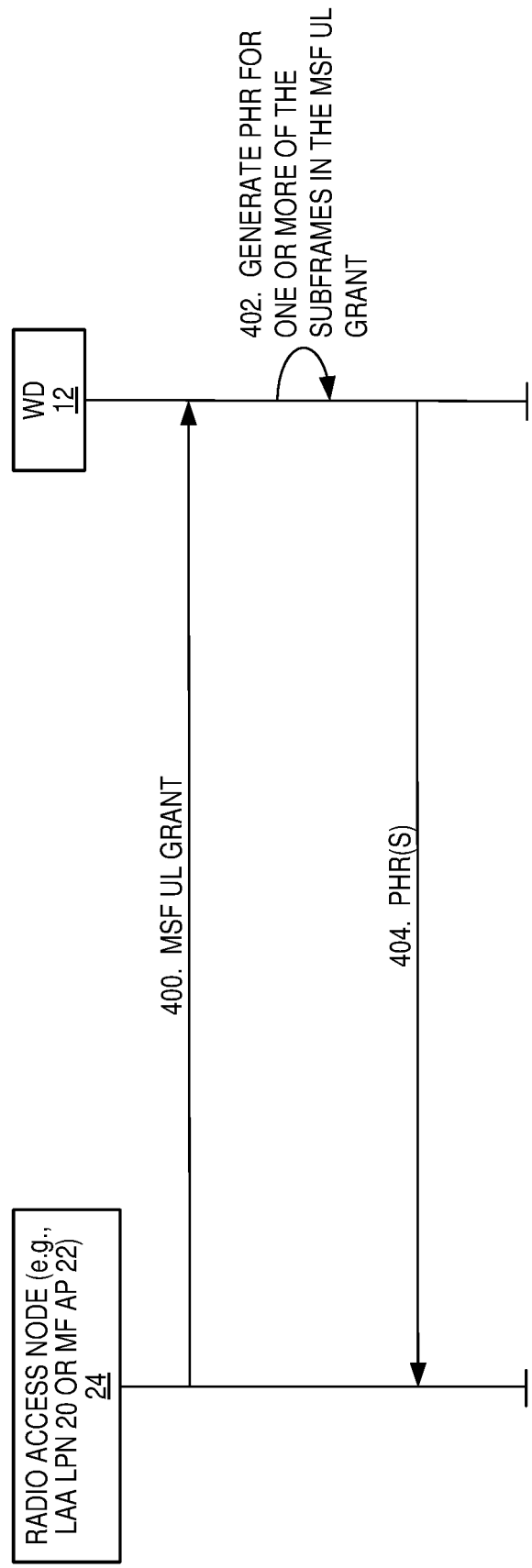
FIG. 15 illustrates the operation of a radio access node and a wireless device according to some other embodiments of the present disclosure.

FIG. 15 illustrates at least some of the aspects of the fourth embodiment described above. The radio access node 24 transmits a MSF UL grant to the wireless device 12 for transmission on a cell(s) in an unlicensed frequency spectrum (step 400). The wireless device 12 generates a PHR for one or more of the subframes in the MSF UL grant (step 402). For example, in some embodiments, the wireless device 12 generates a separate PHR for all of the subframes in the MSF UL grant. In some other embodiments, the wireless device 12 generates a single PHR for one of the subframes in the MSF UL grant such as, e.g., the subframe with the highest PUSCH transmission power. The wireless device 12 transmits the PHR(s) to the radio access node 24 (step 404). For eLAA, the radio access node 24 that transmits the MSF grant and to which the wireless device 12 transmits the PHR(s) is, e.g., the LTE anchor node 14. For MF, the radio access node 24 is the MF AP 22.

In a fifth embodiment, the eNB partitions UEs into different transmit power groups and manages the UL UE scheduling based on these groups and the number of UEs that need to be multiplexed in different UL subframes. For example, the eNB may schedule multiple cell-edge UEs with a higher required UL transmit power in the same subframe, while cell-center UEs with a lower required UL transmit power are multiplexed in another subframe.

Figure 16:
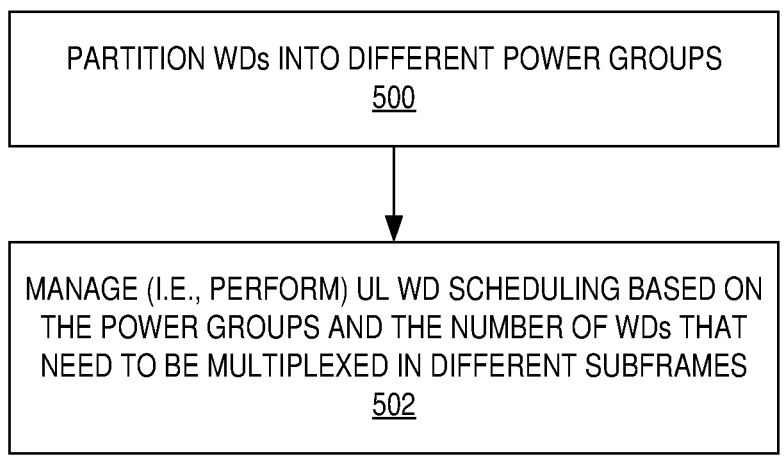
FIG. 16 is a flow chart that illustrates the operation of a radio access node according to some embodiments of the present disclosure.

FIG. 16 is a flow chart that illustrates the operation of a radio access node 24 (e.g., the LTE anchor node 14 for eLAA or the MF AP 22 for MF) according to at least some aspects of the fifth embodiment described above. As illustrated, the radio access node 24 partitions wireless devices 12 into different transmit power groups (step 500). For example, cell-edge wireless devices 12 may be included in a high-power group whereas wireless devices 12 located near the cell center may be included in a low-power group. Still further, other wireless devices 12 may be included in a medium power group. The radio access node 24 then manages (i.e., performs) UL scheduling for the wireless devices 12 based on the power groups and the number of wireless devices 12 that need to be multiplexed in different subframes (step 502). For example, if a large number of wireless devices 12 need to be scheduled in a particular subframe, then the radio access node 24 may, e.g., schedule only wireless devices 12 in the low-power group in that subframe.

Figure 17:
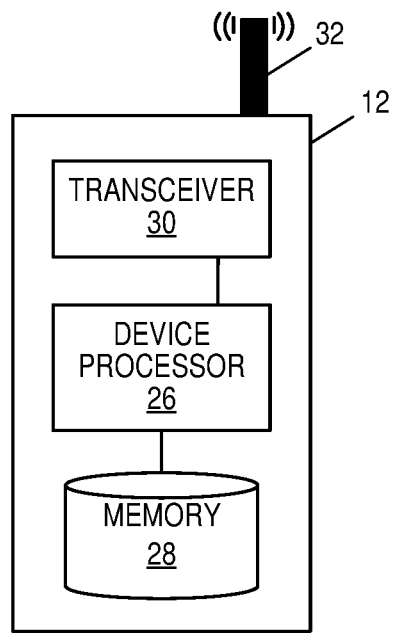
FIGS. 17 and 18 are diagrams illustrating example embodiments of a wireless device.
Figure 18:
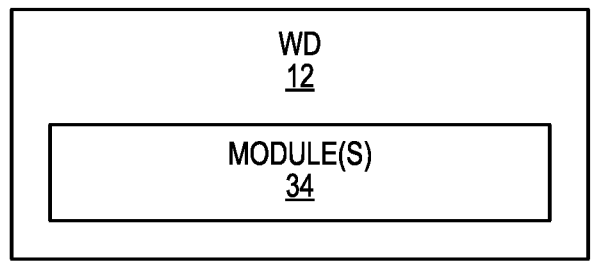

Although wireless devices 12 may represent communication devices that include any suitable combination of hardware and/or software, these wireless devices 12 may, in certain embodiments, represent devices such as the example wireless devices 12 illustrated in greater detail by FIGS. 17 and 18. Similarly, although the illustrated radio access node 24 may represent network nodes that include any suitable combination of hardware and/or software, these nodes may, in particular embodiments, represent devices such as the example radio access nodes 24 illustrated in greater detail by FIGS. 19 and 20.

Referring to FIG. 17, a wireless device 12 comprises a processor 26, memory 28, a transceiver 30, and an antenna (s) 32. As will be appreciated by one skilled in the art, the processor 26 may include, e.g., a Central Processing Unit (CPU), a Digital Signal Processor (DSP), an Application Specific Integrated Circuit (ASIC), a Field Programmable Gate Array (FPGA), or the like, or any combination thereof. In certain embodiments, some or all of the functionality described herein as being provided by UEs, MTC, or M2M devices, and/or any other types of wireless devices 12 may be provided by the processor 26 executing instructions stored on a computer-readable medium, such as the memory 28 shown in FIG. 17. Alternative embodiments may include additional components beyond those shown in FIG. 17 that may be responsible for providing certain aspects of the wireless device's functionality, including any of the functionality described herein.

FIG. 18 illustrates the wireless device 12 according to another example embodiment. As illustrated, the wireless device 12 includes one or more modules 34, each of which is implemented in software. The module(s) 34 generally provide some or all of the functionality described herein as being provided by UEs, MTC, or M2M devices, and/or any other types of wireless devices 12. For example, the module(s) 34 may include a receiving module operable to receive dynamic TPC commands in accordance with either the first embodiment or the second embodiment and a utilizing module that is operable to utilize the TPC commands. As another example, the module(s) may include a performing module operable to perform an LBT procedure, a setting module operable to set UL transmit power parameter(s), and a transmitting module operable to perform an autonomous UL transmission in accordance with the third embodiment.

Figure 19:
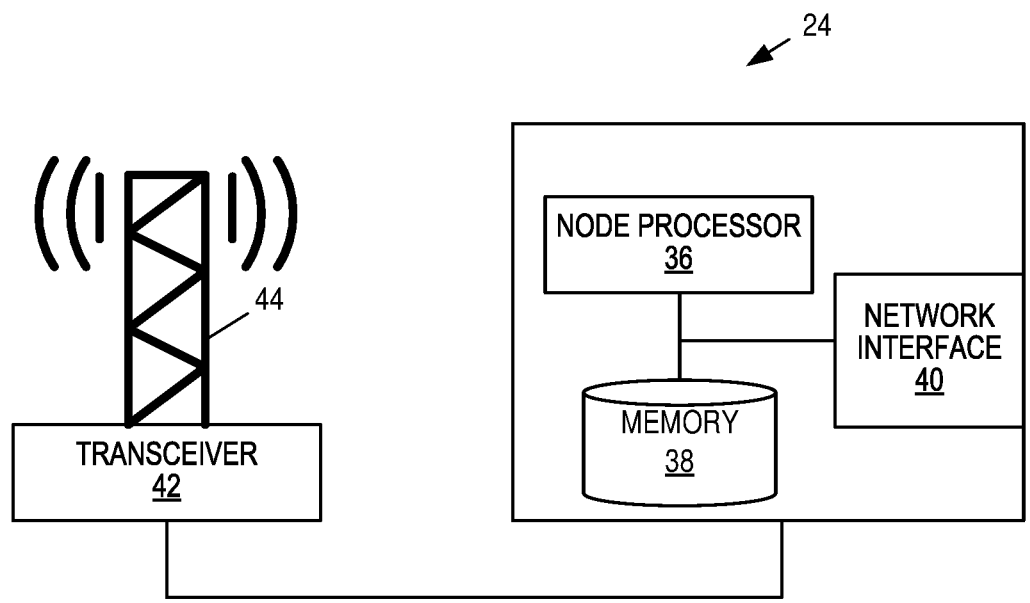
FIGS. 19 and 20 are diagrams illustrating example embodiments of a radio access node.

Referring to FIG. 19, a radio access node 24 comprises a node processor 36, memory 38, a network interface 40, a transceiver 42, and an antenna(s) 44. As will be appreciated by one skilled in the art, the processor 26 may include, e.g., a CPU, a DSP, an ASIC, a FPGA, or the like, or any combination thereof. In certain embodiments, some or all of the functionality described herein as being provided by a base station, a node B, an eNB, and/or any other type of radio access node 24 (e.g., the LTE anchor node, the LAA LPN 20, or the MF AP 22) or network node may be provided by the node processor 36 executing instructions stored on a computer-readable medium, such as the memory 38 shown in FIG. 19. Alternative embodiments of the radio access node 24 may comprise additional components to provide additional functionality, such as the functionality described herein and/or related supporting functionality.

Figure 20:
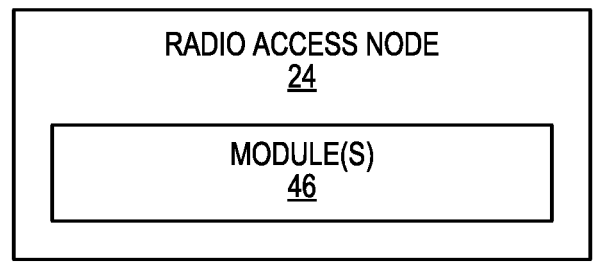

FIG. 20 illustrates the radio access node 24 according to another example embodiment. As illustrated, the radio access node 24 includes one or more modules 46, each of which is implemented in software. The module(s) 46 generally provide some or all of the functionality described herein as being provided by a base station, a node B, an eNB, and/or any other type of radio access node 24 (e.g., the LTE anchor node, the LAA LPN 20, or the MF AP 22) or network node. For example, the module(s) 46 may include an indicating module operable to provide dynamic TPC commands in accordance with either the first embodiment or the second embodiment.

As indicated by the foregoing, certain embodiments are provided for UL power control on unlicensed carriers, with example application to Rel-14 eLAA and MuLTEfire.

While the disclosed subject matter has been presented above with reference to various embodiments, it will be understood that various changes in form and details may be made to the described embodiments without departing from the overall scope of the disclosed subject matter.

The following acronyms are used throughout this disclosure.

μs Microsecond
3GPP Third Generation Partnership Project
5G Fifth Generation
ACK Acknowledgement
AP Access Point
ASIC Application Specific Integrated Circuit
B-IFDMA Block Interleaved Frequency Division Multiple Access
CA Carrier Aggregation
CC Component Carrier
CCA Clear Channel Assessment
CFI Control Format Indicator
C-PDCCH Common Physical Downlink Control Channel
CPU Central Processing Unit
CRC Cyclic Redundancy Check
C-RNTI Cell Radio Network Temporary Identifier
CRS Cell Specific Reference Symbol
CSMA/CA Carrier Sense Multiple Access with Collision Avoidance
dBm Decibel-Milliwatt
DCI Downlink Control Information
DFT Discrete Fourier Transform
DIFS Distributed Inter-Frame Space
DL Downlink
DMRS Demodulation Reference Signal
DSP Digital Signal Processor
DwPTS Downlink Pilot Time Slot
eLAA Enhanced License Assisted Access
eNB Enhanced or Evolved Node B ePDCCH Enhanced Physical Downlink Control Channel
ePUCCH Enhanced Physical Uplink Control Channel
FDMA Frequency Division Multiple Access
FPGA Field Programmable Gate Array
LAA License Assisted Access
LBT Listen-Before-Talk
LPN Low-Power Node
LTE Long Term Evolution
GHz Gigahertz
M2M Machine-to-Machine
MCOT Maximum Channel Occupancy Time
MCS Modulation and Coding Scheme
MeNB Master Enhanced or Evolved Node B
MF MuLTEfire
MHz Megahertz
ms Millisecond
MSF Multi-Subframe
MTC Machine Type Communication
NX Next Generation
OFDM Orthogonal Frequency Division Multiplexing
PCell Primary Cell
PDCCH Physical Downlink Control Channel
PHR Power Headroom Report
PRACH Physical Random Access Channel
PSD Power Spectral Density
PUCCH Physical Uplink Control Channel
PUSCH Physical Uplink Shared Channel
RB Resource Block
Rel Release
SCell Secondary Cell
SC-FDMA Single Carrier Frequency Division Multiple Access
SeNB Secondary Enhanced or Evolved Node B
sPUCCH Short Physical Uplink Control Channel
SRS Sounding Reference Signal
TPC Transmit Power Control
TS Technical Specification
TXOP Transmit Opportunity
UE User Equipment
UL Uplink
WLAN Wireless Local Area Network Those skilled in the art will recognize improvements and modifications to the embodiments of the present disclosure. All such improvements and modifications are considered within the scope of the concepts disclosed herein and the claims that follow.

REFERENCES

[1] 3GPP TS 36.211, V12.3.0 (2014-09), 3rd Generation Partnership Project; Technical Specification Group Radio Access Network; Evolved Universal Terrestrial Radio Access (E-UTRA); Physical Channels and Modulation, Release 12
[2] 3GPP TS 36.213, V12.3.0 (2014-09), 3rd Generation Partnership Project; Technical Specification Group Radio Access Network; Evolved Universal Terrestrial Radio Access (E-UTRA); Physical layer procedures, Release 12
[3] 3GPP TS 36.212, V12.6.0 (2015-03), 3rd Generation Partnership Project; Technical Specification Group Radio Access Network; Evolved Universal Terrestrial Radio Access (E-UTRA); Radio Resource Control (RRC), Release 12
[4] 3GPP TS 36.321, V12.1.0 (2014-03), 3rd Generation Partnership Project; Technical Specification Group Radio Access Network; Evolved Universal Terrestrial Radio Access (E-UTRA); Medium Access Control (MAC) protocol specification, Release 12

What is claimed is:

1. A method of operation of a radio access node for providing transmit power control commands to a wireless device for uplink transmission on a cell that operates in an unlicensed frequency spectrum, comprising:
indicating, for the cell that operates in the unlicensed frequency spectrum, a dynamic transmit power control command using a downlink control channel which indicates a downlink-uplink allocation of upcoming subframes in the cell that operates in the unlicensed frequency spectrum, wherein indicating the dynamic transmit power control command comprises transmitting the downlink control channel comprising an indication of the downlink-uplink allocation of upcoming subframes in the cell and an indication of the dynamic transmit power control command, wherein the indication of the dynamic transmit power control command comprises at least one bit.

2. The method of claim 1 wherein the dynamic transmit power control command is applicable to physical uplink shared channel, short physical uplink control channel, enhanced physical uplink control channel, and/or sounding reference signal transmissions.

3. The method of claim 1 wherein the radio access node is a MuLTEfire, MF, access point.

4. A method of operation of a wireless device for uplink transmission on a cell that operates in an unlicensed frequency spectrum, comprising:
receiving, from a radio access node serving the cell that operates in the unlicensed frequency spectrum, an indication of a dynamic transmit power control command for the cell that operates in the unlicensed frequency spectrum, the indication of the dynamic transmit power control command being comprised in a downlink control channel that also comprises an indication of a downlink-uplink allocation of upcoming subframes in the cell that operates in the unlicensed frequency spectrum, wherein the indication comprises transmit power control commands for multiple subframes of the upcoming subframes.

5. The method of claim 4 further comprising utilizing the indication of the dynamic transmit power control command for uplink transmission on the cell that operates in the unlicensed frequency spectrum.

6. The method of claim 5 wherein utilizing the indication of the dynamic transmit power control command comprises:
performing a Listen-Before-Talk, LBT, procedure for the cell that operates in the unlicensed frequency spectrum; and
transmitting an uplink transmission on the cell that operates in the unlicensed frequency spectrum if a result of the LBT procedure is a decision that a corresponding channel is clear.

7. The method of claim 4 wherein the multiple subframes include at least one non-consecutive subframe.

8. The method of claim 4 wherein the downlink control channel is a common physical downlink control channel.

9. The method of claim 4 wherein the dynamic transmit power control command is applicable to physical uplink shared channel, short physical uplink control channel, enhanced physical uplink control channel, and/or sounding reference signal transmissions.

10. The method of claim 4 wherein the radio access node a MuLTEfire, MF, access point.

11. A wireless device operative to perform uplink transmission on a cell that operates in an unlicensed frequency spectrum, comprising:
- a processor; and
- memory comprising instructions executable by the processor whereby the wireless device is operable to:
  - receive, from a radio access node serving the cell that operates in the unlicensed frequency spectrum, an indication of a dynamic transmit power control command for the cell that operates in the unlicensed frequency spectrum, the indication of the dynamic transmit power control command being comprised in a downlink control channel that also comprises an indication of a downlink-uplink allocation of upcoming subframes in the cell that operates in the unlicensed frequency spectrum, wherein the indication comprises transmit power control commands for multiple subframes of the upcoming subframes.

12. A method of operation of a wireless device for uplink transmission on a cell that operates in an unlicensed frequency spectrum, comprising:
- setting one or more uplink power control parameters for autonomous uplink transmission of multiple subframes on the cell that operates in the unlicensed frequency spectrum based on:
- uplink power control information comprised in a most recent downlink control channel received by the wireless device,
- uplink power control information comprised in a most recent uplink grant received by the wireless device, or
- signaling received on another serving cell of the wireless device.

13. The method of claim 12 further comprising transmitting an autonomous uplink transmission on the cell that operates in the unlicensed frequency spectrum in accordance with the one or more uplink power control parameters.

14. The method of claim 12 wherein setting the one or more uplink power control parameters comprises setting the one or more uplink power control parameters for autonomous uplink transmission on the cell that operates in the unlicensed frequency spectrum based on uplink power control information comprised in a most recent downlink control channel received by the wireless device.

15. The method of claim 14 wherein the most recent downlink control channel is a common downlink control channel or a common physical downlink control channel.

16. The method of claim 12 wherein setting the one or more uplink power control parameters comprises setting the one or more uplink power control parameters for autonomous uplink transmission on the cell that operates in the unlicensed frequency spectrum based on uplink power control information comprised in a most recent uplink grant received by the wireless device.

17. The method of claim 12 wherein setting the one or more uplink power control parameters comprises setting the one or more uplink power control parameters for autonomous uplink transmission on the cell that operates in the unlicensed frequency spectrum based on signaling received on another serving cell of the wireless device.

18. The method of claim 12 wherein the cell that operates in the unlicensed frequency spectrum is a secondary cell of the wireless device that serves the wireless device together with a primary cell of the wireless device that operates in a licensed frequency spectrum in accordance with a carrier aggregation scheme.

19. The method of claim 12 wherein the cell that operates in the unlicensed frequency spectrum is a standalone serving cell of the wireless device.

* * * * *